(12) United States Patent
Delfino et al.

(10) Patent No.: US 7,762,272 B2
(45) Date of Patent: Jul. 27, 2010

(54) GASEOUS FUEL VEHICLE AND AUTOMATIC VENT SYSTEM

(75) Inventors: Antonio Delfino, Grolley (CH); Daniel Laurent, Marly (CH); Philippe Macherel, Chenens (CH)

(73) Assignees: Conception Et Developpement Michelin S.A., Granges-Paccot (CH); Paul Scherrer Institut, Villigen (CH)

( * ) Notice: Subject to any disclaimer, the term of this patent is extended or adjusted under 35 U.S.C. 154(b) by 331 days.

(21) Appl. No.: 11/930,387

(22) Filed: Oct. 31, 2007

(65) Prior Publication Data

US 2008/0047609 A1  Feb. 28, 2008

Related U.S. Application Data

(62) Division of application No. 11/117,873, filed on Apr. 29, 2005, now Pat. No. 7,337,799.

(30) Foreign Application Priority Data

Apr. 30, 2004  (FR)  ................... 04 04690

(51) Int. Cl.
*F16K 17/38* (2006.01)
(52) U.S. Cl. ................. 137/79; 137/67; 251/11
(58) Field of Classification Search .................. 137/79, 137/67, 72; 251/11
See application file for complete search history.

(56) References Cited

U.S. PATENT DOCUMENTS

| 2,413,490 | A | * | 12/1946 | Evans ........................... 137/72 |
| 4,554,027 | A | | 11/1985 | Tautzenberger et al. . 148/11.5 R |
| 4,774,923 | A | | 10/1988 | Hayashi ...................... 123/463 |
| 5,632,297 | A | | 5/1997 | Sciullo et al. ................. 137/73 |
| 5,632,505 | A | | 5/1997 | Saccone et al. ............. 280/737 |
| 5,747,187 | A | | 5/1998 | Byon ............................ 29/58 |
| 5,862,995 | A | | 1/1999 | Wu ......................... 239/533.2 |
| 6,006,774 | A | | 12/1999 | Lhymn et al. ................. 137/72 |
| 6,039,030 | A | | 3/2000 | Robinson et al. ............ 123/457 |
| 6,073,700 | A | | 6/2000 | Tsuji et al. .................... 169/90 |
| 6,286,536 | B1 | | 9/2001 | Kamp et al. ............. 137/68.13 |
| 6,296,012 | B1 | | 10/2001 | Kilgore et al. .............. 137/468 |
| 6,367,499 | B1 | | 4/2002 | Taku ........................... 137/72 |
| 6,418,962 | B1 | | 7/2002 | Wozniak et al. ............. 137/266 |
| 6,676,163 | B2 | | 1/2004 | Joitescu et al. .............. 280/834 |
| 6,786,245 | B1 | | 9/2004 | Eichelberger et al. .......... 141/4 |

(Continued)

FOREIGN PATENT DOCUMENTS

EP  1 070 620 A2  1/2001

(Continued)

*Primary Examiner*—John Rivell
*Assistant Examiner*—Craig M Schneider
(74) *Attorney, Agent, or Firm*—Fitzpatrick, Cella, Harper & Scinto

(57) ABSTRACT

A vehicle (1) equipped with a tank (2) for storage of a fluid under pressure on the vehicle, the tank being connected to at least one vent channel (3 and 33), the vent channel leading to a discharge orifice (34), the vent channel being connected to the tank by means of at least one safety valve, wherein in that the safety valve is a thermal release valve (5), normally closed and capable of opening spontaneously under the effect of a rise in temperature, the safety valve being installed in a predefined zone of the vehicle and the discharge orifice being remote from the predefined zone.

4 Claims, 5 Drawing Sheets

U.S. PATENT DOCUMENTS

| | | |
|---|---|---|
| 7,043,350 B2 | 5/2006 | Abe et al. ................... 701/103 |
| 2001/0018929 A1 | 9/2001 | Taku .......................... 137/505 |
| 2003/0127543 A1 | 7/2003 | Rieger et al. ................ 239/584 |
| 2004/0140662 A1 | 7/2004 | Laurent et al. .............. 280/831 |

FOREIGN PATENT DOCUMENTS

| | | | |
|---|---|---|---|
| EP | 1 070 620 | A3 | 5/2002 |
| EP | 1431096 | A2 | 6/2004 |
| FR | 2 791 758 | | 10/2000 |
| FR | 2 828 139 | | 2/2003 |
| FR | 2 829 435 | A1 | 3/2003 |
| JP | 57-210221 | A | 12/1982 |
| JP | 60-073200 | A | 4/1985 |
| WO | 03/035419 | | 5/2003 |
| WO | 2004/014683 | A1 | 2/2004 |

\* cited by examiner

GASEOUS FUEL VEHICLE AND AUTOMATIC VENT SYSTEM

CROSS-REFERENCE TO RELATED APPLICATIONS

This application is a divisional application of U.S. application Ser. No. 11/117,873, filed Apr. 29, 2005, now U.S. Pat. No. 7,337,799, the entire disclosure of which is incorporated by reference herein. U.S. application Ser. No. 11/117,873 claims benefit of French Patent Application No. 04/04690, filed Apr. 30, 2004, the entire disclosure of which is incorporated by reference herein.

BACKGROUND OF THE INVENTION

1. Field of the Invention

The present invention relates to tanks for storing gas in a road vehicle whatever its motorization, and more particularly but not solely applicable for the storage of gaseous hydrogen and/or the storage of gaseous oxygen in a vehicle with a fuel cell.

2. Description of Related Art

One of the problems posed by the storage of gas on a vehicle is the danger of fire occurring in the vicinity of the tank and of the pressure rising too highly. Discharge valves have already been proposed for liquefied petroleum gas vehicles in order to allow the gas to escape progressively in case of excess pressure caused, for example, by abnormal heating due to a fire. Because it is necessary, at all costs, to avoid the risk of explosion, even if it means that the fuel feeds a fire below a limited output. This is why safety valves which are opened irreversibly under the effect of overheating have already been proposed in the state of the art. For example, patent application JP60/073200 which describes such a safety valve in which the sealing element is a membrane sealing an orifice and the element controlling a definitive opening is a pellet produced in a shape memory alloy carrying a needle so that, in case of overheating, the pellet made of a shape memory alloy changes shape and pushes the needle back against the membrane until rupture of the membrane occurs.

However, no solution is known which is sufficiently robust to be installed in a car and for playing a safety role solely in case of fire. Hence, for example, no satisfactory solution is known to make it possible to avoid gaseous fuel that escapes from the tank aggravating a fire which might have occurred without the fuel supply system being the root cause. Hence, in case of an accident involving several vehicles, if one of these vehicles loses its fuel which then spreads over the road, there is a significant risk that the fuel will catch fire and that another vehicle will find itself immobilized above this fire. In this case, if the fire takes place under the gaseous fuel tank of this other vehicle, supposing that the latter is equipped with a discharge valve in case of excess pressure, it is necessary first of all to wait until the pressure in the tank rises before such a safety element plays its part. Furthermore, if the pressure prevailing in the tank is low because the residual quantity of fuel is low, it will be necessary to wait longer before such a security element acts, at such a point that the material forming the tank might have lost its mechanical properties to the point of yielding and therefore provoking an explosion before even the pressure is sufficiently raised for the discharge valve to act in case of excess pressure.

If one were able to act sooner to vent the tank, the safety conditions of the vehicles storing a gaseous fuel under pressure would improve, in particular in vehicles with a fuel cell which function on hydrogen.

In the field of fuel cell vehicles, patent application WO03/035419 proposes means for evacuating hydrogen not consumed by the cell, by collecting the leakages around the cell and the tank, and by installing an excess pressure valve on the tank. Here again, nothing is provided to improve safety in case of fire.

BRIEF DESCRIPTION OF THE INVENTION

One object of the invention resides in providing that, in case of fire, the fluid tank under pressure which exists on board a vehicle is automatically vented in as short a time as possible, by guiding the fluid as far as possible away from the place where the fire has broken out.

The invention proposes a vehicle equipped with a tank for storage of a fluid under pressure, the tank being connected to at least one vent channel, the vent channel leading to at least one discharge orifice, the vent channel being connected to the tank by means of at least one safety valve, wherein the safety valve is a thermal release valve, normally closed and capable of opening spontaneously under the effect of a rise in temperature, the safety valve being installed in a predefined zone of the vehicle and the discharge orifice being remote from the predefined zone.

The invention likewise proposes a thermal release valve comprising a release mechanism using a release element produced in a shape memory alloy with features such that, when it is subjected for the first time to a rise in temperature taking it beyond a predefined temperature threshold, it adopts a memorized shape in a thermally irreversible manner.

Two practical embodiments of an application for a hydrogen tank are described below.

The first embodiment utilizes a safety valve comprising an opening mechanism controlled by a pellet produced in a shape memory material. The other embodiment proposes a safety valve controlled by a mechanism comprising a capsule destroyed by the effect of heat. In both cases, the two embodiments have the advantage that they function even when the electrical installation controlling the entire operation of the vehicle is out of action. In fact, the elements necessary for control of the safety valves function on thermomechanical principles.

One can, for example, install the actual tank at the rear of the vehicle. One can also install the tank in the floor, in the central part of the latter because it is a zone less susceptible to being deformed even in the case of a particularly violent accident to the vehicle. It is possible to have the channel routed to ensure routing of the fluid under pressure out of the vehicle when passing into a zone which is particularly sensitive to the risks of fire and to install the safety valve at this position.

For example, observing that there is a risk that a fire could exist under the floor of a vehicle, the vent channel can be routed under the floor so as to install at this position a thermal release valve, then the vent channel continues to the discharge orifice which is disposed remote from the floor, for example on the roof of the vehicle. It is this application which is illustrated in more detail below.

However, there are many other possible applications. If it is considered necessary to protect against the consequences of a fire breaking out in the engine compartment, the channel can also be installed so as to lead to the front of the vehicle, for example, in the compartment where the fuel cell producing the electrical energy necessary for the vehicle is housed so as to install there the thermal release valve, then the vent channel is routed up to the discharge orifice which is disposed remote from this compartment, for example, at the rear of the vehicle.

A plurality of zones can be dealt with in the same way where it is considered that there is a significant risk for a fire beginning and the consequences of which one desires to cancel or at least to reduce. For example, one can deal with the passenger compartment of a vehicle. One can deal with the tank of whatever gas presents a certain danger, in particular all the gases cited above.

It may be added finally that one can install in parallel a plurality of vent channels all emanating from the same tank, all leading to the same discharge orifice, each one passing through a zone of the vehicle where a fire is likely to break out in order to install there a thermal release valve.

A non-limiting example of use of the invention is illustrated below in the case where the tank is of a particular type, described in patent application EP 03/028056.4, filed on Dec. 8, 2003.

DESCRIPTION OF THE BEST EMBODIMENT OF THE INVENTION

Figure 1:
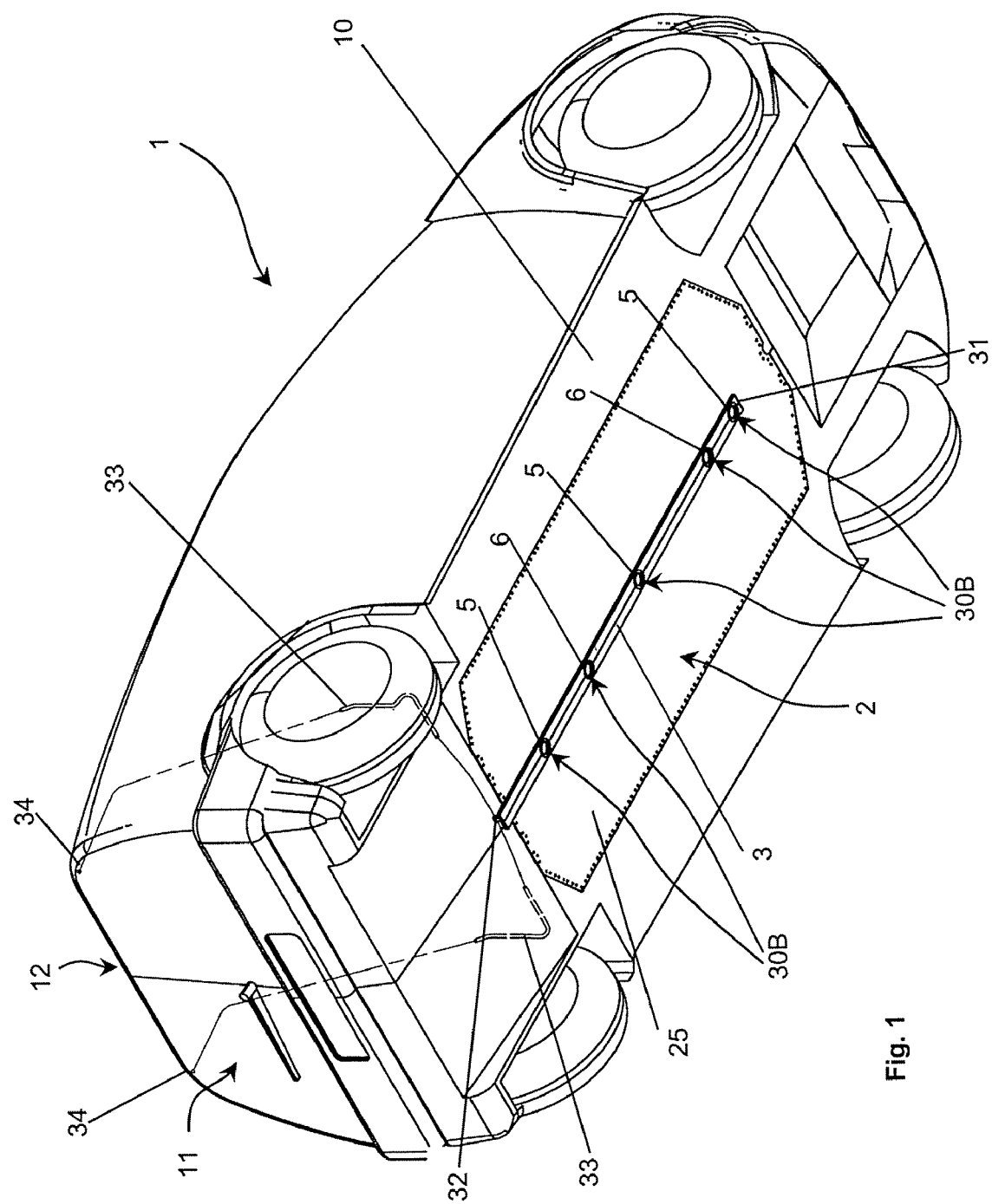
FIG. 1 is a view of a passenger vehicle showing the general installation of the elements of the invention.

In FIG. 1 a passenger vehicle 1 can be seen having a floor 10 including at least one tank 2 for storage on the vehicle of a gas under pressure. It can concern any fluid stored at high pressure, for example liquefied petroleum gas, compressed natural gas or compressed hydrogen, or even oxygen. In the following, it is assumed that the tank 2 is a tank for storage of a single gaseous fluid, for example gaseous hydrogen, without this being limiting.

Figure 2:
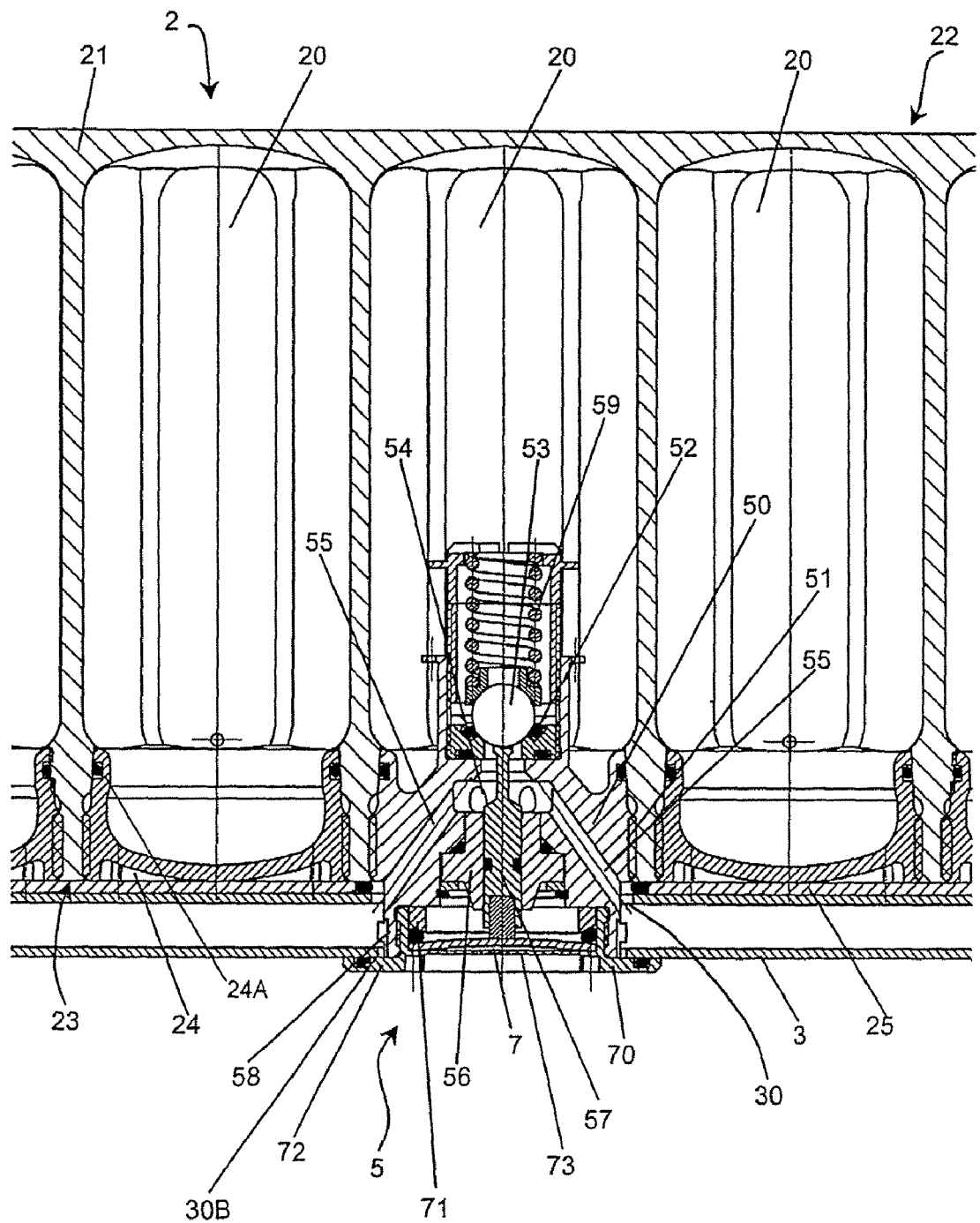
FIG. 2 shows a safety valve in the normally closed configuration, connected to a multiple cell tank.

In FIG. 2 and those following, it can be seen that the tank 2 comprises a very large number of cells 20 with a small volume, connected to each other. The tank comprises a base 21 which comprises as many recesses as cells 20. The recesses all extend from a first face 22 towards the opposite face 23. They all discharge at the first face 22 and do not discharge at the opposite face 23. Each recess is sealed by a cap 24 except where a safety valve is installed which then takes the place of such a cap. The caps 24 are screwed onto the base 21, with a gasket 24A being provided in an appropriate recess. Patent application EP 03/028056.4 provides more details on the formation of the tank 2.

A protective metal sheet 25 is placed against the lower face 23 of the tank 2. A drain channel 3 is disposed just below the protective metal sheet 25, longitudinally relative to the vehicle. The drain channel 3 is a very flattened rectangular section, which appears likewise in the following Figures. From the front side of the vehicle, the drain channel 3 is sealed by a wall 31. From the rear side of the vehicle, the drain channel 3 leads to one or two fittings 32 to which pipes 33 are coupled. The drain channel 3 and the pipes 33 together form the vent channel. The pipes 33 lead to discharge orifices 34. The latter are situated on the vertical rear wall 11 of the vehicle 1, at a level near the roof 12.

The drain channel 3 comprises a specific number of first borings 30 (see FIG. 2) produced at least on one of the large faces of the drain channel 3. Furthermore, the drain channel 3 comprises a specific number of second borings 30B produced on the other of the large faces of the drain channel and opposite each of the first borings 30. The first borings and the second borings 30B are produced, for example, at five positions as can be seen in FIG. 1. The first and second borings 30 and 30B are exactly opposite five cells 20 of the tank 2. The protective metal sheet 25 likewise comprises five borings, also exactly opposite the same five cells 20 of the tank 2.

Safety valves are screwed onto the tank 2, at the position of as many caps 24 as has already been indicated, i.e., opposite five positions mentioned above. The drain channel 3 is maintained pressed against the protective metal sheet 25 and therefore against the tank 2 so as to ensure communication with the safety valves and the impermeability relative to the outside. In this example, three thermal release valves 5 and two pressure threshold valves 6 are used, the structure of each of these types of valves described hereafter. Hence, the drain channel 3 allows parallel branching of a plurality of cells 20 and, when one or more of the safety valves installed on specific cells 20 open, the gaseous fluid which escapes through the safety valve or valves is collected via the vent channel and discharged at one or more discharge orifices 34.

Figure 3:
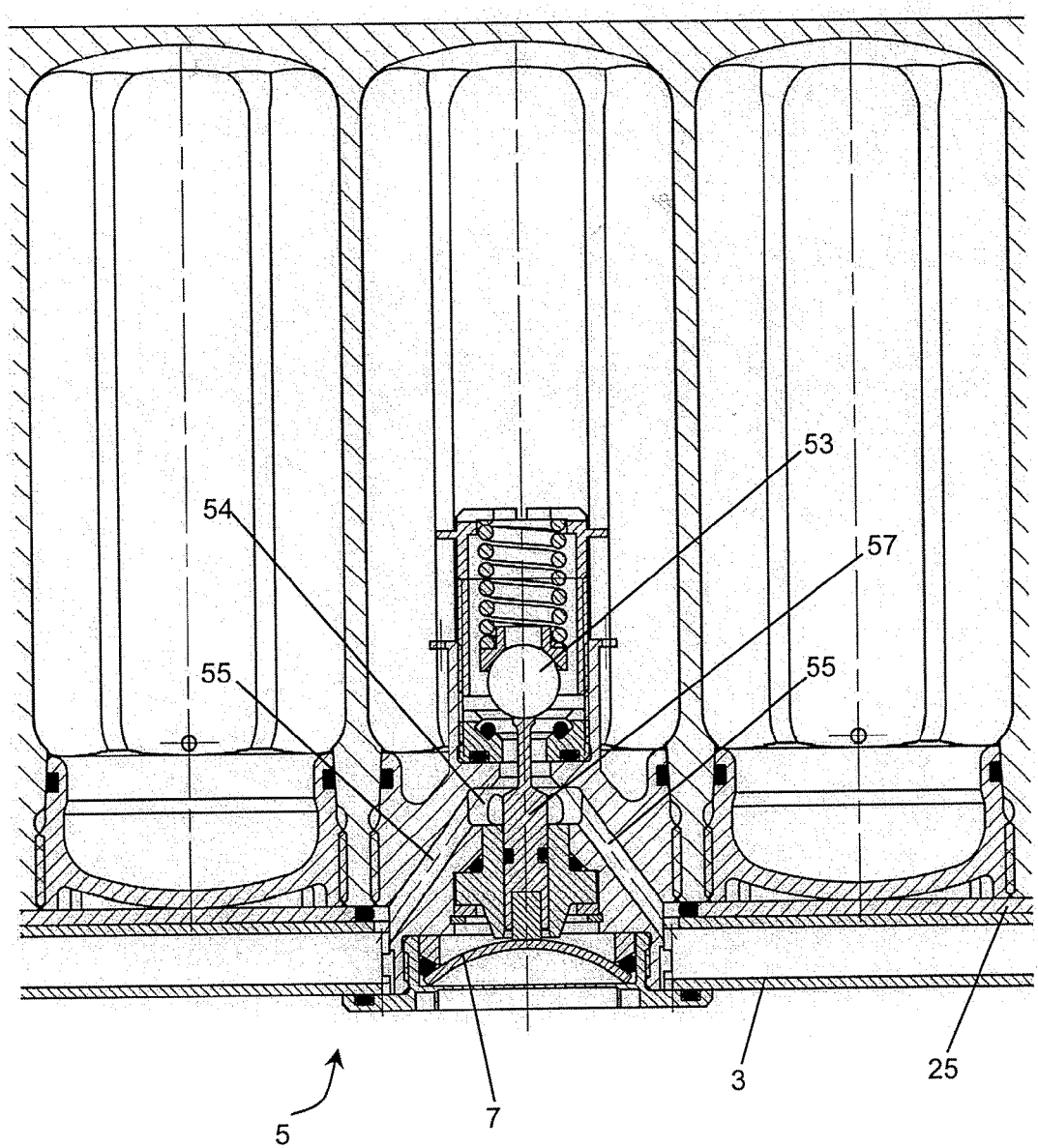
FIG. 3 shows the safety valve of FIG. 2, in an open configuration.

FIGS. 2 and 3 depict a first embodiment of the details for producing a thermal release safety valve 5.

A body 50 comprising a thread 51 to be screwed onto the tank 2 can be seen. This body 50 comprises a seat 52 sealed by a ball 53. A spring 59 can be installed which causes a moderate pre-load tending to push back the ball 53 against its seat 52. Furthermore, the more the pressure of the fluid inside the cell 20 is raised, the more the ball 53 tends to press firmly against its seat 52, thus ensuring perfect impermeability.

Under the seat 52, there can be seen a chamber 54 communicating with conduits 55 leading over the lateral wall of the body 50. The centre of the body 50 comprises a boring inside which a sleeve 56 is mounted, ensuring guidance of a central piston 57. On the opposite side to the seat 52, the body 50 comprises a collar 58 which receives a seal 70 by screwing. The seal has on one side a central cylindrical wall 73 and a peripheral ring 72. On the interior side, the seal 70 encloses a pellet 7 produced in a shape memory alloy which is furthermore supported on a ring 71, itself mounted against the body 50. It may be noted that, when the body 50 has been screwed onto the tank 2, the body 50 projects beyond the tank 2. Because of the first 30 and second 30B borings produced on the drain channel 3, and similar borings produced on the protective metal sheet 25, when the protective metal sheet and the drain channel are installed, the collar 58 of each of the bodies 50, remains accessible from the outside. One can screw the seal 70 on the body 50 whilst constricting the protective metal sheet 25 and the drain channel 3 due to the ring 72 of each seal 70, the ring pressing on the exterior wall of the drain channel 3. The drain channel 3 is thus maintained sealed on the body 50.

FIGS. 2 and 3 show a seal 70 of the recessed type, i.e., the seal comprises a thin central cylindrical wall 73 in order to isolate the pellet 7 from the outside. This has the advantage of offering mechanical protection against outside influences without slowing down in particular the heating of the pellet 7. However, consideration can also be given to using a fixing piece devoid of this thin central cylindrical wall, which allows direct contact of the source of heat (flames) with the pellet 7, for a minimum reaction time.

The valve proposed by the invention can be useful in applications other than the passenger vehicle 1 described above.

The valve permanently opens as soon as it is subjected to the first rise in temperature. It comprises a ball cooperating with a seat and a spring pushing back the ball against its seat in order to keep the valve in the normally closed position at ambient temperature, and comprises a pellet made of a shape memory alloy which has a first shape at ambient temperature, a piston being interposed between the ball and the pellet. According to an essential feature of the valve according to the invention, the pellet made of a shape memory alloy is of the type which adopts a memorized shape the first time that it is subjected to a rise in temperature. For this reason, the piston pushes the ball back out of its seat when the pellet passes from the first shape to the memorized shape.

It is known that shape memory alloys change from a crystalline structure to another during passage into a determined temperature zone. It is from this transformation that the shape memory alloys gain their properties and their name. The result is that any object produced in a shape memory alloy can be given two different shapes: one at low temperature and the other at high temperature, termed hereafter "memorized shape". The temperature zone at which the transformation occurs depends upon the composition of this alloy and upon the conditions to which this alloy has been subjected by exercising specific mechanical constraints in determined temperature conditions.

With this in mind, as far as the production of the pellet 7 is concerned, there is used for example an NiTi shape memory metal. This alloy undergoes a change in its crystalline structure when it is cooled, i.e., the alloy passes from its hard state, of austenitic structure (high temperature), to its easily deformable state, of martensitic structure (low temperature). The chosen transition temperature for the pellet 7 is approximately 90° C. (with + or −5° C.). A material having the required properties is well known to the person skilled in the art; by way of information it is available for example at Special Metals Corporation, New Hartford, N.Y. The pellet has an initial shape of a spherical cap (close to the one figuring in FIG. 3). At ambient temperature, the pellet is in the martensitic state (soft). It can be deformed mechanically quite easily so as to assume an approximately flat shape (disc shape, illustrated in FIG. 2). When the pellet reaches a temperature of the order of 90° C., it changes phase and passes from the martensitic state to the austenitic state (hard). The pellet therefore reassumes its initial shape (memorized shape), which is a spherical cap. This shape persists even after a return to ambient temperature. This means that the chosen material is irreversible in its shape whilst being reversible in its structure because it has passed from the austenitic state (hard) to the martensitic state (soft). The only way of making it reassume a disc shape is by an external mechanical action.

Preferably, in the normally closed position at ambient temperature, there remains a slight clearance between the pellet 7, the central piston 57 and the ball 53 so that the latter remains firmly pressed against its seat 52. In FIG. 2, the appearance of the pellet 7 at ambient temperature can be seen.

In FIG. 3, the appearance which the same pellet 7 adopts under the effect of a rise in temperature (memorized shape) can be seen. The degree of deformation depends upon the dimensioning of the pellet 7 itself. For a pellet produced as indicated above, the deformation begins when the pellet 7 has reached the temperature of 75° C. As soon as the assembly clearance is taken up, the pellet develops a large force. As soon as the ball has been raised sufficiently the force developed by the pellet reduces but remains sufficient to oppose the force developed by the spring. The maximum deformation as illustrated in FIG. 3 is achieved when the pellet 7 has reached the temperature of 100° C. Furthermore, it has been shown that such a pellet 7 is capable of developing a sufficiently large force to be able to push back the piston 57 in opposition to the internal pressure which is applied on the ball from the side of the cell containing the fluid under raised pressure (of the order of 200-300 bar) and in opposition to the pressure of a retaining spring.

As already indicated, after thermal stress then cooling of such a pellet 7, if it is wished for it to reassume its initial shape for example in order to recondition the thermal release safety valve 5, it is necessary to deform it mechanically. Because of the pellet 7, as a result of the fact that sufficient heating makes it assume the memorized shape permanently, the valve 5 opens in a specific manner and remains open even if the heating is reduced or stops.

It has just been indicated that the thermal release valve 5 comprises a pellet 7 produced in a shape memory alloy. This is a preferred embodiment of a release mechanism using a release element produced in a shape memory alloy, the shape memory alloy having features such that it adopts, when it is subjected for the first time to a rise in temperature taking it beyond a predefined temperature threshold, a memorized shape, and in a thermally irreversible manner.

Of course, a specific number of seals are used to ensure perfect impermeability of assembly, as appears clearly in the drawings. The conduits 55 leading onto the lateral wall of the body 50 are in direct communication with the drain channel 3 so that, in case of thermal release safety valve 5 opening, the gases escape into the chamber 54 then are routed through conduits 55 leading over the lateral wall of the body 50, where they rejoin the drain channel 3 without being able to escape into the exterior environment at the level of the thermal release safety valve 5 from the drain channel 3.

Figure 5:
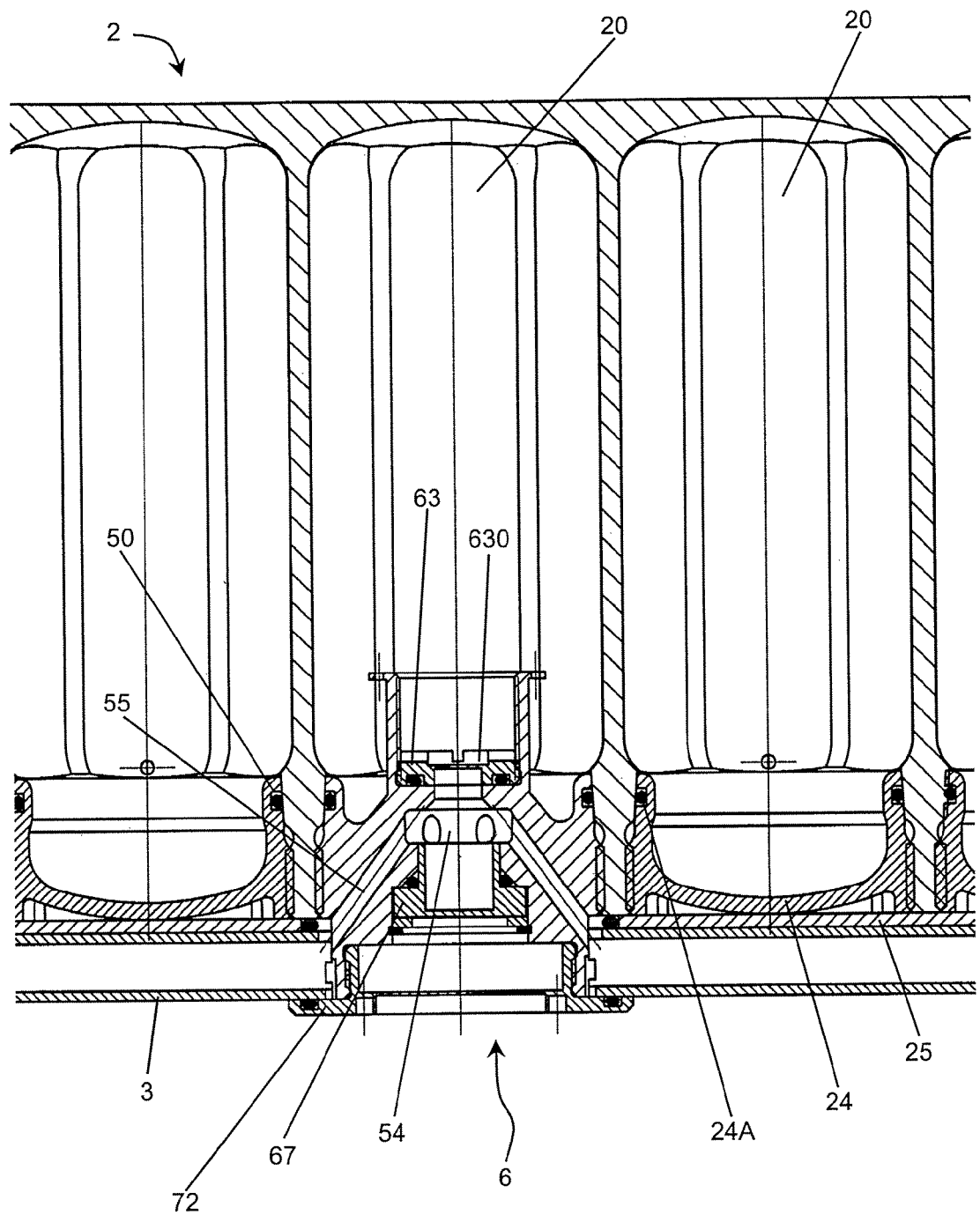
FIG. 5 shows still another embodiment of a safety valve in a normally closed configuration, connected to the same tank.

It is of course possible to add other types of valves as, for example, a pressure threshold valve 6, such as the one illustrated in FIG. 5. The latter uses the same body 50 as the body of the thermal release valve 5. On the side of the tank, this body 50 receives an insert 63 comprising in its center 630 a calibrated rupture membrane. The insert 63 is interchangeable. The chamber 54 is closed by a cap 67. The body 50 receives a nut, and a seal 70 of the recessed type identical to that used in FIGS. 1 and 2.

Hence, in a particularly advantageous implementation of the invention, the tank of the vehicle comprises an assembly of interconnected cells in order to ensure circulation of the fluid necessary for use of the vehicle, at least two cells each branched at the vent channel, each of the cells being connected to the vent channel by means of at least one safety valve, one of the safety valves being the thermal release valve, the other of the safety valves being a pressure threshold valve which opens automatically and definitively (irreversible opening for example by destruction of a cover) beyond a predefined pressure threshold.

Figure 4:
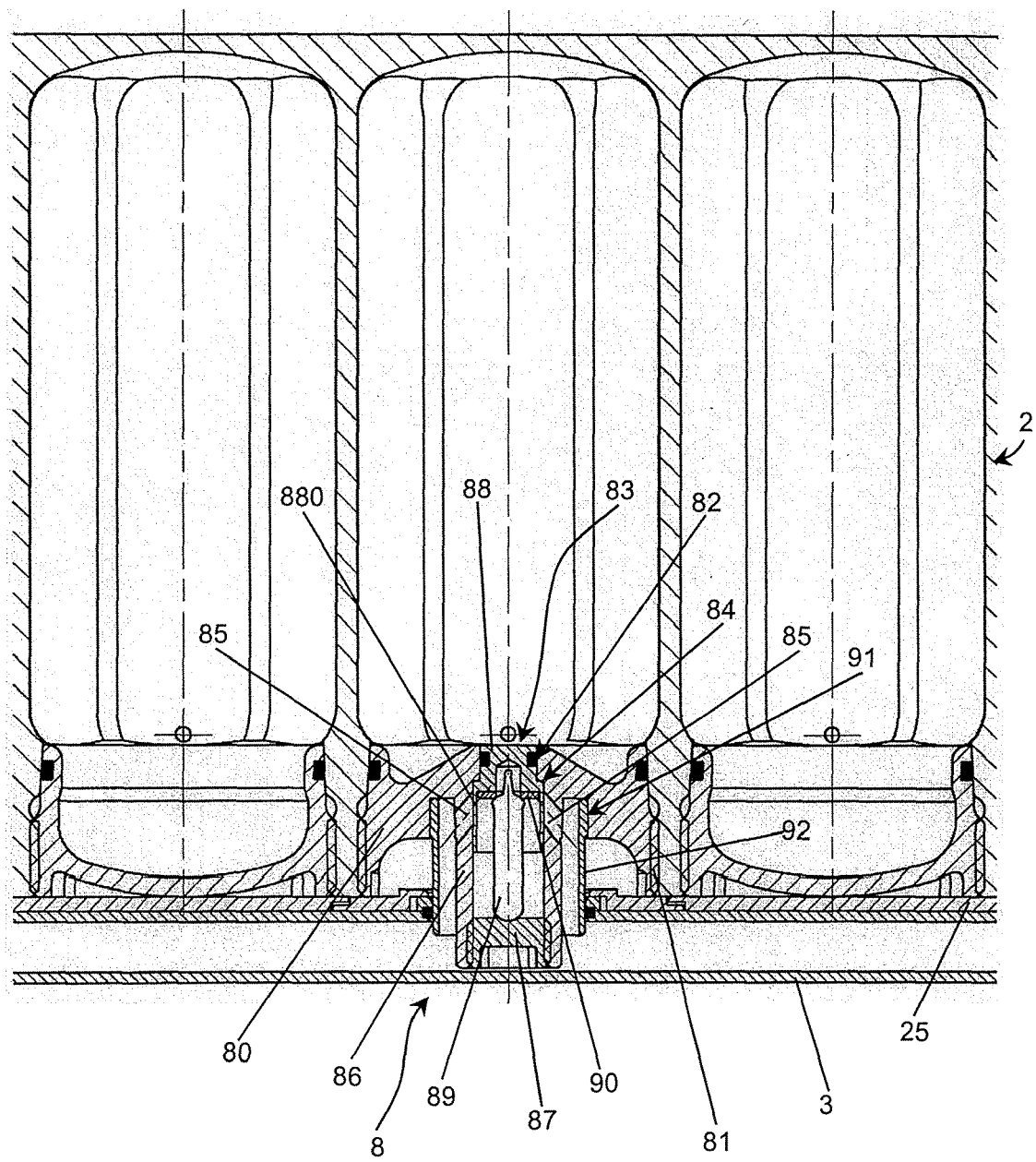
FIG. 4 shows another embodiment of a safety valve in a normally closed configuration, connected to the same multiple cell tank.

In FIG. 4, an embodiment variant of a thermal release valve 8 is represented, in which the release mechanism utilizes a capsule destructible under the effect of heat (not used in FIG. 1). A body 80 can be seen comprising a thread 81 to be screwed onto the tank 2. This body 80 comprises a first boring 82 sealed by a central piston 83 comprising a head 88 and a skirt 880 delimiting a central hollow zone opened on one side and closed on the other side by the head 88. The body comprises a central passage 86 defining a second boring 84 which has a slightly larger diameter than the diameter of the first boring 82. The central piston 83 is guided into the second boring 84. The interior of the central passage 86 communicates with one or more conduits 85 leading over the exterior wall of the passage 86. The passage 86 is closed by a seal 87. A capsule 89 is intercalated between the seal 87 and a support washer 90 which is placed against the head 88 of the piston 83. This capsule 89 breaks at a predefined temperature. For example it is possible to find such capsules breaking at a temperature of the order of 90° C. at JOB GmbH, Kurt-Fischer-Strasse 30, D-22926 Ahrensburg.

The body 80 also comprises a third boring 91 inside which a sleeve 92 is mounted delimiting a substantially annular space around the passage 86. This space is in communication with the drain channel 3. When the capsule 89 breaks, nothing else prevents the central piston 83, on which the pressure of the fluid in the cell 20 acts, from retracting against the seal 87, thus putting the cell 20 in connection with the interior of the passage 86, with the conduit or conduits 85, with the substantially annular space surrounding the passage, and finally with the drain channel 3.

Various gaskets ensure perfect impermeability of the assembly, as shown in the drawing. Apart from the central release mechanism, the valve of FIG. 4 is quite similar to that of FIGS. 2 and 3, its adaptation being identical in any case.

The invention claimed is:

1. A valve that becomes permanently opened when subjected for a first time to a rise in temperature, the valve comprising:
   a release element that includes a disk-shaped pellet formed of a shape memory alloy configured so that, when the pellet is subjected for a first time to a rise in temperature beyond a predefined threshold temperature, the release element adopts a memorized shape in a thermally irreversible and permanent manner, wherein adoption of the memorized shape produces an applied force that permanently opens the valve.

2. The valve according to claim 1, wherein the pellet has an approximately flat shape at ambient temperature, and the memorized shape is a spherical cap shape.

3. A valve that becomes permanently opened when subjected for a first time to a rise in temperature, the valve comprising:
   a release mechanism that includes a release element formed of a shape memory alloy configured so that the release element assumes a first approximately flat shape at ambient temperature and, when the release element is subjected for a first time to a rise in temperature above a predefined threshold temperature, the release element adopts a memorized spherical cap shape in a thermally irreversible and permanent manner, wherein adoption of the memorized spherical cap shape produces an applied force that permanently opens the valve.

4. The valve according to claim 3, further comprising a ball cooperating with a seat and a spring pushing the ball against the seat in order to keep the valve in a normally closed position at ambient temperature, wherein the release element includes a pellet made of a shape memory alloy, and wherein the release mechanism further includes a piston interposed between the ball and the pellet, the piston pushing the ball out of the seat when the pellet passes from the first approximately flat shape to the memorized spherical cap shape, in response to a thrust exercised by the pellet.

* * * * *